(12) United States Patent
Zeiler et al.

(10) Patent No.: US 12,494,516 B2
(45) Date of Patent: Dec. 9, 2025

(54) CELL MODULE ASSEMBLIES BATTERY PACK

(71) Applicant: BRIGGS & STRATTON, LLC, Wauwatosa, WI (US)

(72) Inventors: Jeffrey Zeiler, Pewaukee, WI (US); Jacob Schmalz, Milwaukee, WI (US); Michael Marshall, Wauwatosa, WI (US); Jim Busse, Kenosha, WI (US)

(73) Assignee: Briggs & Stratton, LLC, Wauwatosa, WI (US)

( * ) Notice: Subject to any disclaimer, the term of this patent is extended or adjusted under 35 U.S.C. 154(b) by 714 days.

(21) Appl. No.: 17/781,444

(22) PCT Filed: Dec. 1, 2020

(86) PCT No.: PCT/US2020/062725
§ 371 (c)(1),
(2) Date: Jun. 1, 2022

(87) PCT Pub. No.: WO2021/113251
PCT Pub. Date: Jun. 10, 2021

(65) Prior Publication Data
US 2022/0416312 A1    Dec. 29, 2022

Related U.S. Application Data

(60) Provisional application No. 62/942,649, filed on Dec. 2, 2019.

(51) Int. Cl.
*H01M 10/42*    (2006.01)
*H01M 10/0525*    (2010.01)
(Continued)

(52) U.S. Cl.
CPC ..... *H01M 10/425* (2013.01); *H01M 10/0525* (2013.01); *H01M 10/482* (2013.01);
(Continued)

(58) Field of Classification Search
None
See application file for complete search history.

(56) References Cited

U.S. PATENT DOCUMENTS 5,140,744 A  *  8/1992  Miller ................. A47B 87/00
                                                        429/96
8,353,374 B2    1/2013  Sugawara et al.
(Continued)

FOREIGN PATENT DOCUMENTS

CN          108140746 A       6/2018
WO      WO-2015/099476        7/2015

OTHER PUBLICATIONS

International Search Report and Written Opinion regarding Int'l. Appl. No. PCT PCT/US2020/062725, mail date Apr. 9, 2021, 21 pps.

*Primary Examiner* — Wyatt P McConnell
(74) *Attorney, Agent, or Firm* — Foley & Lardner LLP

(57) ABSTRACT

A battery pack includes a battery housing, a positive terminal, a negative terminal, a plurality of cell module assemblies, and a battery management system. The plurality of cell module assemblies are received within an internal cavity of the battery housing, and include a plurality of lithium-ion battery cells that are connected in parallel. The battery management system is in communication with at least one of the plurality of cell module assemblies within the internal cavity, and is structured to receive a voltage tap measurement from each of the plurality of cell module assemblies within the internal cavity, compare the voltage tap measurement from each of the plurality of cell module assemblies to an expected voltage tap measurement, and determine if a voltage tap measurement for a cell module assembly within the plurality of cell module assemblies deviates from the expected voltage tap measurement to identify a faulty cell module assembly.

17 Claims, 8 Drawing Sheets

(51) Int. Cl.
   *H01M 10/48*   (2006.01)
   *H01M 50/213*  (2021.01)
(52) U.S. Cl.
   CPC .. *H01M 50/213* (2021.01); *H01M 2010/4271* (2013.01); *H01M 2010/4278* (2013.01)

(56) References Cited

U.S. PATENT DOCUMENTS

| | | |
|---|---|---|
| 8,446,040 B2 | 5/2013 | Paik et al. |
| 2005/0218867 A1 | 10/2005 | Phillips et al. |
| 2006/0024575 A1 | 2/2006 | Robinson et al. |
| 2013/0164569 A1* | 6/2013 | Srinivasan .......... H01M 10/486 |
| | | 429/7 |
| 2015/0064513 A1* | 3/2015 | Thoelmann ....... H01M 10/4207 |
| | | 429/61 |
| 2016/0093842 A1 | 3/2016 | Blanco et al. |
| 2016/0330044 A1 | 11/2016 | Andrews |
| 2017/0373287 A1* | 12/2017 | Yamashita .......... H01M 50/367 |
| 2018/0035573 A1 | 2/2018 | Taguchi et al. |
| 2018/0053971 A1 | 2/2018 | Matsui et al. |
| 2018/0205055 A1* | 7/2018 | Hilligoss ............. H01M 10/443 |
| 2018/0354375 A1 | 12/2018 | Dao et al. |
| 2019/0075724 A1 | 3/2019 | Becke et al. |
| 2019/0081370 A1 | 3/2019 | Capati et al. |
| 2019/0237726 A1* | 8/2019 | Dubois .................... H02H 7/00 |
| 2019/0237817 A1 | 8/2019 | Hammerschmied et al. |
| 2021/0213851 A1* | 7/2021 | Cooper .................. B60L 53/66 |

\* cited by examiner

CELL MODULE ASSEMBLIES BATTERY PACK

CROSS-REFERENCE TO RELATED APPLICATION

This application is a National Stage Application of PCT/US2020/062725, filed Dec. 1, 2020 which claims the benefit of U.S. Provisional Application No. 62/942,649, filed Dec. 2, 2019, both of which are incorporated herein by reference in their entireties.

BACKGROUND

Battery packs may be used with different types of equipment, including outdoor power equipment, vehicles, aerial man lifts, floor care devices, golf carts, lift trucks and other industrial vehicles, floor care devices, recreational utility vehicles, industrial utility vehicles, lawn and garden equipment, and energy storage or battery backup systems. Outdoor power equipment includes lawn mowers, riding tractors, snow throwers, pressure washers, portable generators, tillers, log splitters, zero-turn radius mowers, walk-behind mowers, riding mowers, and turf equipment such as spreaders, sprayers, seeders, rakes, and blowers. Outdoor power equipment may, for example, use one or more electric motors to drive an implement, such as a rotary blade of a lawn mower, a pump of a pressure washer, the auger of a snow thrower, the alternator of a generator, and/or a drivetrain of the outdoor power equipment. Vehicles include cars, trucks, automobiles, motorcycles, scooters, boats, all-terrain vehicles (ATVs), personal water craft, snowmobiles, utility vehicles (UTVs), and the like.

SUMMARY

One exemplary embodiment relates to a battery pack. The battery pack includes a battery housing that defines an internal cavity. A positive terminal and a negative terminal each extend through the housing, so as to be externally accessible. A plurality of cell module assemblies (CMAs) are received within the internal cavity. The plurality of CMAs are electrically coupled to the positive terminal and the negative terminal. Each of the plurality of CMAs includes a top CMA cell holder frame defining a plurality of first pockets, a bottom CMA cell holder frame defining a plurality of second pockets, a top collector plate coupled to the top CMA cell holder frame, a bottom collector plate coupled to the bottom CMA cell holder frame, and a plurality of lithium-ion battery cells. The plurality of lithium-ion battery cells are connected in parallel, and are each partially received in one of the plurality of first pockets and one of the plurality of second pockets. The lithium-ion battery cells are each coupled to the top collector plate and the bottom collector plate. The battery pack also includes a battery management system. The battery management system is in communication with at least one of the plurality of CMAs within the internal cavity. The battery management system is structured to receive a voltage tap measurement from each of the plurality of CMAs within the internal cavity, compare the voltage tap measurement from each of the plurality of CMAs to an expected voltage tap measurement, determine if a voltage tap measurement for a CMA within the plurality of CMAs deviates from the expected voltage tap measurement and, in response to determining that the voltage tap measurement for a CMA within the plurality of CMAs deviates from the expected voltage tap measurement, generate an alarm including locating information identifying which of the plurality of CMAs has a voltage tap measurement that deviates from the expected voltage tap measurement so that the CMA can be serviced.

Another exemplary embodiment relates to a battery pack. The battery pack includes a battery housing that defines an internal cavity. A positive terminal and a negative terminal each extend through the housing, so as to be externally accessible. A plurality of cell module assemblies (CMAs) are received within the internal cavity. The plurality of CMAs are electrically coupled to the positive terminal and the negative terminal. Each of the plurality of CMAs includes a top CMA cell holder frame defining a plurality of first pockets, a bottom CMA cell holder frame defining a plurality of second pockets, a top collector plate coupled to the top CMA cell holder frame, a bottom collector plate coupled to the bottom CMA cell holder frame, and a plurality of lithium-ion battery cells. The plurality of lithium-ion battery cells are connected in parallel, and are each partially received in one of the plurality of first pockets and one of the plurality of second pockets. The lithium-ion battery cells are each coupled to the top collector plate and the bottom collector plate. The battery pack also includes a battery management system. The battery management system is in communication with at least one of the plurality of CMAs within the internal cavity. The battery management system is structured to receive a temperature measurement from at least one of the plurality of CMAs within the internal cavity and, in response to receiving the temperature measurement from each of the plurality of CMAs within the internal cavity, activating a resistive heating element within the internal cavity to adjust a temperature within the internal cavity of the battery housing to create a more uniform temperature distribution within the internal cavity.

Another exemplary embodiment relates to a battery pack. The battery pack includes a battery housing that defines an internal cavity. A positive terminal and a negative terminal each extend through the housing, so as to be externally accessible. A plurality of cell module assemblies (CMAs) are received within the internal cavity, and include a first tier of CMAs and a second tier of CMAs. The plurality of CMAs are electrically coupled to the positive terminal and the negative terminal. Each of the plurality of CMAs includes a top CMA cell holder frame defining a plurality of first pockets, a bottom CMA cell holder frame defining a plurality of second pockets, a top collector plate coupled to the top CMA cell holder frame, a bottom collector plate coupled to the bottom CMA cell holder frame, and a plurality of lithium-ion battery cells. The plurality of lithium-ion battery cells are connected in parallel, and are each partially received in one of the plurality of first pockets and one of the plurality of second pockets. The lithium-ion battery cells are each coupled to the top collector plate and the bottom collector plate. The battery pack also includes a battery management system. The battery management system is in communication with at least one of the plurality of CMAs within the internal cavity. The battery management system is configured to monitor useful life indicators of the at least one CMA. The battery pack further includes a plurality of aluminum plates. A first aluminum plate is located below the first tier of CMAs and a second aluminum plate is located below the second tier of CMAs. The bottom CMA cell holder frames of each CMA are configured to space the plurality of lithium-ion battery cells apart from the aluminum plate located below each bottom CMA cell holder frame.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

The disclosure will become more fully understood from the following detailed description, taken in conjunction with the accompanying figures.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
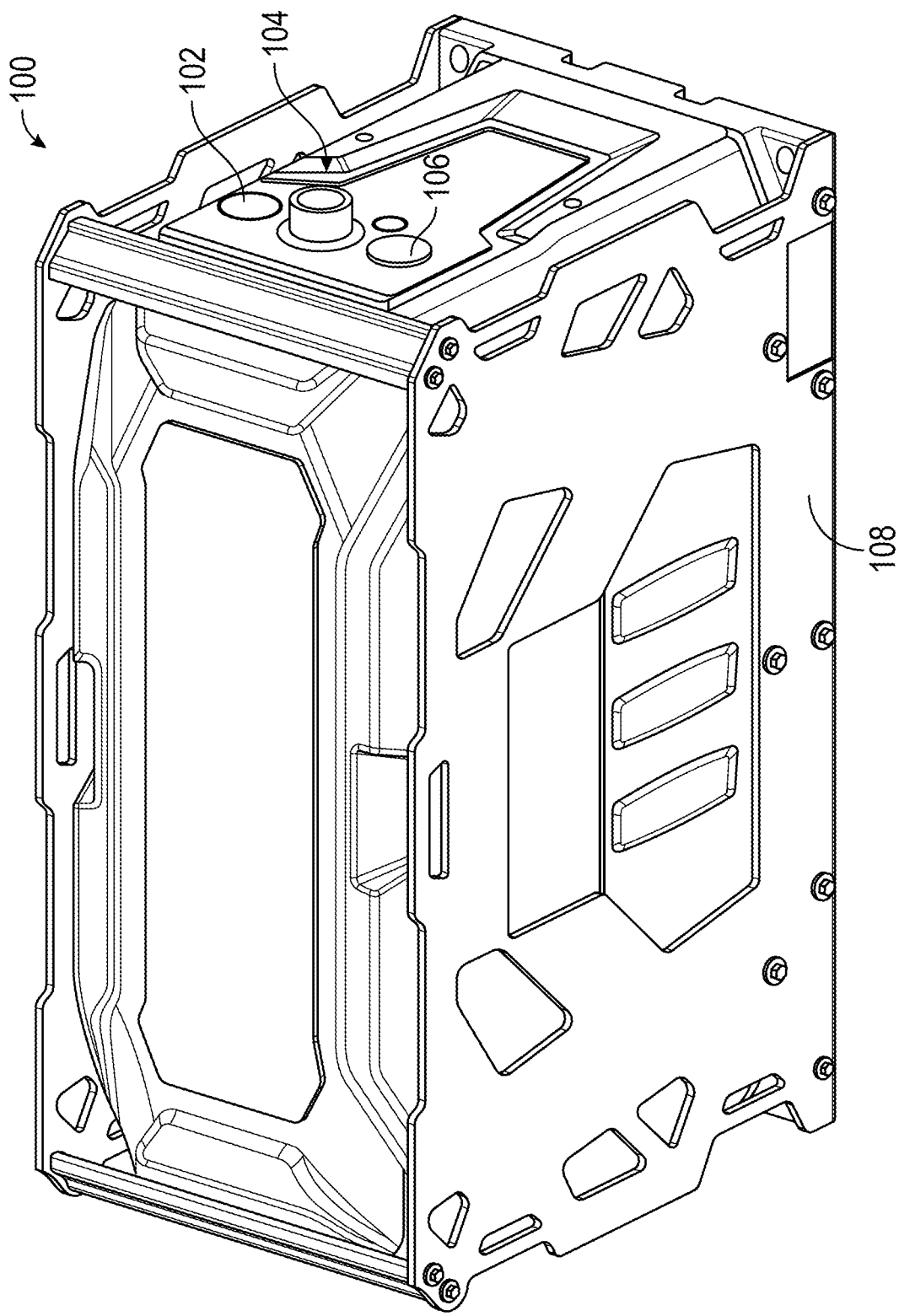
FIG. 1 is a top perspective view of a housing for a battery pack, according to an exemplary embodiment.

Referring to FIG. 1, a top perspective view of a battery pack 100 with a housing 108 is illustrated, according to an exemplary embodiment. The housing 108 is an exterior enclosure for receiving and protecting the internal components of a battery pack 100. In some embodiments, the housing 108 is a battery pack case that includes one or more removable components that permit easy access to the battery pack 100 inside. The housing 108 includes a negative terminal 102, a panel-mounted data connection terminal 104, and a positive terminal 106. The data connection terminal 104 is positioned between the positive and negative terminals 102 and 106, on a common side of the housing 108. In other embodiments, the data connection terminal 104 is positioned elsewhere on the panel of the battery pack 100. In some embodiments, the housing 108 is a single five-sided enclosure that covers the battery pack 100, and sits upon a bottom base plate. In some embodiments, the five sides of the housing 108 are made out of a polymeric material. In some embodiments, the internal cavity of the housing 108 is regulated by an internal circulating fan to create a uniform internal environment. In some embodiments, when the battery pack 100 is assembled, the battery pack 100 is set on a bottom plate of the exterior housing and the five-sided plastic enclosure covers and seals the battery pack 100 to prevent water or debris from getting inside the battery pack 100. The housing 108 can be adaptable for a different size and capacity of the assembled battery pack 100. The housing 108 of the battery pack 100 includes a user interface with an electrically isolated front panel. The panel-mounted data connection terminal 104 of the battery pack 100 may provide protection for short-circuiting the terminals 102, 106 of the battery pack 100. The panel-mounted data connection terminal 104 may also include poka-yoked pins for controlling different current capacities in the single connector. In some embodiments, the poka-yoked pins prevent the coupling of incorrect components to the panel-mounted data connection terminal 104.

Figure 2:
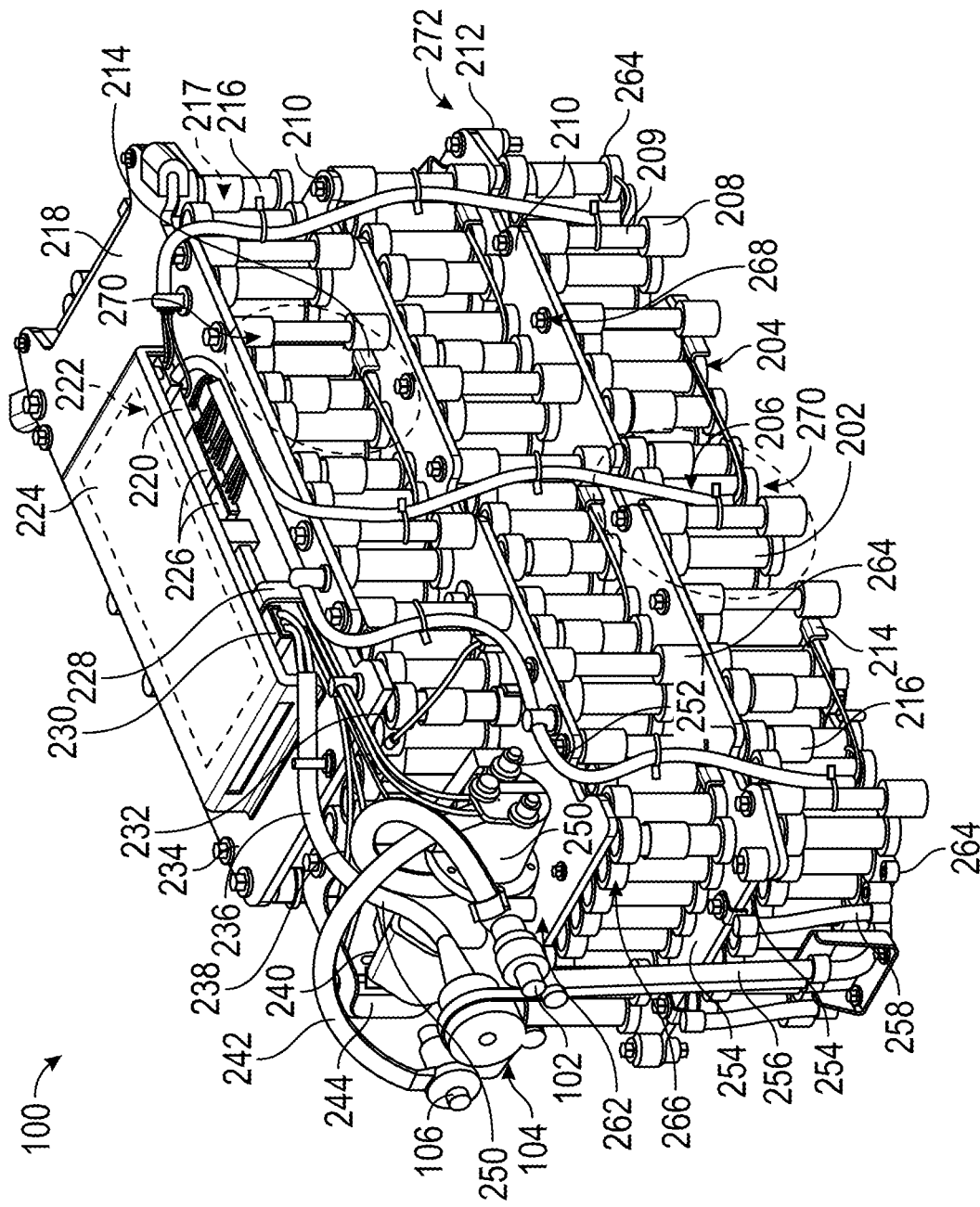
FIG. 2 is a perspective view of a battery pack of cell module assemblies with the housing of FIG. 1 removed, according to an exemplary embodiment.

Referring to FIG. 2, a perspective view of the battery pack 100 is shown, according to an exemplary embodiment. The battery pack 100 includes a top plate 218, midplates 210, an anti-rack plate 234, spacers 209, harness cutouts 206, and mounting hardware 268. In some embodiments, the top plate 218 and the midplates 210 (which are positioned between the top plate 218 and a base plate at the bottom of the battery pack 100) are made out of aluminum. Each plate 210, 218 may contain several harness cutouts 206 to help the routing of the cables throughout the battery pack 100. The harness cutouts 206 may be used to retain the wire harnesses of the battery pack 100. Further, the harness cutouts 206 in the plates of the battery pack 100 allow wires to run between tiers without the expansion of the form factor of battery pack 100. The battery pack 100 may be constructed using a series of lip seals with tie down rails and latches.

The battery pack 100 may include multiple cell module assemblies (CMAs) 270 vertically positioned in tiers, where a first tier of CMAs 270 is positioned directly above a second tier of CMAs 270. Each CMA 270 includes a top CMA cell holder frame (e.g., the top CMA cell holder frame 702 shown in FIG. 7), a bottom CMA cell holder frame (e.g., the bottom CMA cell holder frame 704 shown in FIG. 7), a top collector plate (e.g., the positive collector plate 266), a bottom collector plate (e.g., the negative collector plate 254), multiple battery cells 202, and curable adhesive to couple the battery cells 202 to the top of the CMA cell holder frame and the bottom CMA cell holder frame. The components included in the CMAs 270 are shown and described in additional detail below with respect to FIGS. 4-8. The CMAs 270 may be spaced apart from one another and positioned between the midplates 210, a midplate 210 and a top plate 218, and/or the bottom midplate 210 and a base plate 402 (shown in FIG. 4) of the battery pack 100. Each tier of the battery pack 100 can include two midplates 210 and several CMAs 270. In some embodiments, the midplates 210 are positioned between the positive terminals of the battery cells 202 of the CMAs 270 within the battery pack 100.

In some embodiments, the battery pack 100 is assembled such that there are gaps between the battery cells of each CMA 270 and a plate (e.g., the top plate 218, midplates 210, or bottom or base plate of the housing 108). These gaps between the battery cells 202 of the CMAs 270 and the plates in each tier of the battery pack may prevent damage to the battery pack 100 during thermal events. For example, the gaps between the cells of the CMAs 270 and the plates (e.g., the top plate 218, the midplates 210) allow ejected material from a bad battery cell to build up above the bad battery cell instead of the material extending sideways to the other battery cells 202 in the CMA 270. Beneficially, when heat is dissipated from the bad battery cell, the likelihood of the thermal event cascading to the other battery cells 202 and causing more damage to the components of the battery pack 100 is reduced. A catastrophic chain reaction from one bad battery cell igniting neighboring battery cells (e.g., battery cells above or below a run-away battery cell) and propagating through a short circuit to other battery cells 202 is a potential source of failure in conventional batteries. The plates between the positive side of battery cells 202 in the CMAs 270 and the adjacent plates help prevent run-away battery cells from propagating the run-away event and potentially leading to the failure of battery pack 100.

Each of the plates in the battery pack 100 can be electrically isolated to allow each tier of the battery pack 100 to be disconnected while servicing an individual CMA 270 of the battery pack 100. In some embodiments, each CMA 270 of the battery pack 100 can be replaced with removable fasteners and common service tools, such as wrenches and screwdrivers. In some embodiments, each tier of the battery pack 100 is electrically disconnected from the rest of the battery pack 100 until the final assembly of the battery pack is completed and the end wires are connected. The ability to isolate a CMA 270 requiring service due to one or more bad battery cells can advantageously improve the health and battery life of the overall battery pack 100.

The mounting hardware 268 may include fasteners that are easily serviceable with tools such as wrenches. In addition to the mounting hardware 268 used throughout the battery pack 100 providing structure and stability for the battery pack 100, the mounting hardware 268 may provide thermal conductivity along all structural components, plates, spacers, etc. of the battery pack 100. The spacers 209 between all of the tiers of the battery pack 100 may include compression limiters 208. The compression limiters 208 may be steel or aluminum and are adapted to provide a thermally conductive path, while still maintaining electrically independent tiers, through the tiers of the battery pack 100. For example, the compression limiters 208 may route heat throughout the battery pack 100. In some embodiments, each compression limiter 208 of a spacer 209 has a unique serial number.

A thermistor 217 may be coupled to one of the battery cells 202 within a CMA 270 of the battery pack 100. In some embodiments, the thermistor 217 is secured to a battery cell 202 with tape 216. In some embodiments, closed cell foam adhesive is used to mount the thermistors 217 to the battery cells 202. Each CMA 270 within the battery pack 100 includes one thermistor 217 to monitor the temperature of that individual CMA 270. The battery pack 100 may also include a resistive heating strip on the plates for uniformly heating the battery pack 100. In some embodiments, each tier has a resistive heating strip that runs at a different heating capacity than the heating strips on the other tiers. The resistance of the resistive heating element may change based upon its own temperature. For example, the variable resistance of the heating elements may be based on the temperature of the heating element. As such, when a certain area of the battery pack 100 is determined to be at a higher temperature than the rest of the battery pack 100 (e.g., the top tier of the battery pack is near a component of outdoor power equipment that produces a lot of external heat), the resistive heating element near that area may have a lower heating level than other resistive heating elements in the battery pack 100. For example, the top tier of the battery pack 100 may have a resistive heating element at a lower wattage than a resistive heating element on a lower tier, such as the bottom tier of the battery pack 100. The resistive heating strips and thermistors 217 can communicate with a battery management system (BMS) 222 to control the temperature within the battery pack 100.

In some embodiments, a tier of the battery pack 100 may include more resistive heating elements than a different tier. In some embodiments, the resistive heating elements may have positive or negative coefficients to increase the capability of the battery pack 100 to be thermally self-regulated. The battery pack 100 may receive external power to run the internal pack heating elements (e.g., the resistive heating strips) from a charger, or another energy source, using the existing external terminals. As such, the temperature of the battery pack 100 may be increased above a threshold temperature level without any current flowing into or out of the battery pack 100 and the battery cells 202. In some embodiments, an internal circulating fan helps create a uniform internal temperature for the battery pack 100 without exchanging air outside of the housing 108 of the battery pack 100. Advantageously, by creating a more uniform temperature level inside the housing 108, the battery pack 100 may avoid a particular area of the battery pack 100 having a much higher temperature than the other components of the battery pack 100.

Each CMA 270 of the battery pack 100 includes multiple battery cells 202, which can together output power to operate a vehicle or other equipment, such as various outdoor power equipment. In some embodiments, the battery cells 202 are lithium-ion battery cells. The battery cells 202 can be lithium-ion battery cells rated at 3.6 volts and 3 amp-hours, for example. As illustrated, each of the fourteen CMAs 270 include thirty-two battery cells 202 arranged in four rows of eight cells each, which can be seen in greater detail in FIG. 4. The battery cells 202 are electrically connected to one another using conducting wires having terminals coupled (e.g., wire bonded) to each battery cell 202 and a common conductor (e.g., a positive collector plate 266 or negative collector plate 254). In some embodiments, the wire bonds are 20 mils wire between ⅜ to ½ inch to provide a continuous current of 60 Amps (A) per wire bond without fusing. Each CMA 270 can be identified with an individual identifier (e.g., serial number, bar code, etc.) for use by a CMA 270 manufacturer to track, categorize, evaluate, or record information or data about an individual CMA 270. The individual identifier can then be used by a battery management system (BMS) 222 to relay information about which CMAs 270 in the battery pack 100 need servicing.

The battery pack 100 also includes the BMS 222 for regulating the currents and/or voltages involved in the charging and discharging processes in order to ensure that the battery cells 202 are not damaged or otherwise brought to problematic charge states. For example, the BMS 222 may block an electrical current from being delivered to the battery cells 202, or may block a current being drawn from the battery cells 202 based on the current and voltage properties of the signal and/or of the CMA 270. The BMS 222 may also implement controls based on a temperature as detected by a temperature sensor (e.g., thermistor 217) and regulate operation of the CMAs 270 based on over temperature or under temperature conditions determined by the detected temperature received. Additionally, the BMS 222 may allow operation with a battery pack having a variable power supply. The battery pack 100 can be connected in series or parallel because of the protected BMS 222 within the battery pack 100. In some embodiments, the same BMS 222 may be used with a battery pack 100 that has a nominal voltage (V) of 24V, 36V, or 48V.

In some embodiments, a dual controller area network (CAN) bus data communication line is included in the battery pack 100 and electrically and communicatively coupled to the BMS 222, enabling vehicle and/or machine functionality. The two baud rates of the dual CAN bus line may allow the battery pack 100 to act as a gateway (e.g., an Internet of Things (IoT) gateway) between the vehicle (e.g., outdoor power equipment) and the dual CAN bus line in the battery. In some embodiments, an IoT gateway is also included in the battery pack 100 (e.g., integrated with the BMS 222), rather than external to the battery pack 100. The dual CAN bus line may implement IoT in the battery pack 100 to use as an IoT module for the vehicle (e.g., outdoor power equipment).

The maximum charge capacity of the battery cells 202 of the CMAs 270 in the battery pack 100 decay over the life of the battery pack 100 as the battery pack 100 ages. This decay is caused by the battery pack 100 being cycled by discharging and then recharging the battery pack 100, changes in temperature (e.g., high temperatures), and degradation of the chemistry of the battery cells 202. A cycle is the transition from the battery pack's fully charged state (as allowed by the BMS 222) to a partially or fully discharged state (as allowed by the BMS 222). As the number of cycles increases over the life of the battery pack 100, the battery pack 100's maximum charge capacity declines.

The BMS 222 of the battery pack 100 may include an integrated data logger and may be programmed to store data related to the operation of the CMAs 270 in a memory of the BMS 222. The information recorded by the BMS 222 may then be used to determine a useful life measurement for each CMA. The useful life measurement may be expressed in terms of a percentage of life (e.g., the CMA 270 is at 100% life when brand new). The useful life measurement may be used to set multiple end of life thresholds tied to certain applications for the CMAs 270. For example, a CMA's first life could extend between 100% and 70% charge capacity where the CMA 270 would be suitable for use powering outdoor power equipment (e.g., a commercial lawn mower). After the end of the first life (e.g., a useful life measurement below 70%), a CMA 270 may be reconditioned and put to use in its second life (e.g., between 70% and 50%), in which the CMA 270 is suitable for use in a battery pack for equipment having lower energy requirements than the equipment powered by the CMA 270 during its first life in battery pack 100. In some embodiments, the programming of the BMS 222 of the battery pack 100 being used in a second life is reset or reconfigured. By resetting the programming of the BMS 222 at the beginning of the battery pack 100's second life, the BMS 222 may show a charge capacity of 100% relative to its new lowered charge capacity. For example, the BMS 222 may include an "odometer" like measurement that is reset such that a 5 kilowatt-hour (kW-hr) battery pack with a charge capacity of 80% is now a 4 kW-hr battery pack with a charge capacity at 100%.

The useful life measurement can be determined by a number of data points indicative of useful life that can be monitored and saved by the BMS 222. These useful life indicators include charge capacity, days, or other time elapsed since a commissioning date when each CMA 270 is first put into service, number of cycles since the commissioning date, depth of cycle for individual cycles or groups of cycles, an electrical charge meter that counts the number of coulombs supplied by the CMAs 270 since the commission date, an event counter of operation of the CMAs 270 in extreme temperature conditions (e.g., above 140 degrees Fahrenheit) for individual events or groups of events, the current supplied by the CMAs 270, the current received by the CMAs 270 for charging, the voltage supplied by the CMAs 270, and/or the voltage applied to the CMAs 270 during charging. In other embodiments, different combinations of useful life indicators are monitored and saved by the BMS 222. The useful life indicators identified above may be monitored individually in some embodiments or monitored in any combination in other embodiments. In other embodiments, useful life indicators are tracked and stored for each individual battery cell 202 of each CMA 270 in the battery pack 100 in the integrated memory of the BMS 222.

Gathering and tracking useful life indicators across the life of the CMA 270 rather than a single instantaneous reading indicative of the end of life (e.g., 70% charging capacity) provides additional information to classify a CMA 270 for reconditioning to an appropriate use. In some embodiments, not every data point associated with a useful life indicator is stored, for example temperature may be sampled and stored on a weekly basis rather than daily basis. CMAs 270 may be classified where different classifications are suitable for use in different second lives or based on different expected future performance in the second life as determined by the evaluation of the useful life indicators from the first life. Tracking useful life indicators also provides the CMA 270 manufacturer with data that can be used for diagnostics to determine why a particular CMA 270 performs better or worse than a similar CMA 270 and then use that diagnostic information to improve manufacturing or other processes for new CMAs.

For example, a CMA 270 with 70% charging capacity, but a relatively high number of days operated in extreme temperature conditions may have its charging capacity degrade at a faster rate than a CMA 270 with a 70% charging capacity and no days operated in extreme temperature conditions. Both CMAs 270 may be suitable for reconditioning and use in their second lives, but the appropriate uses for the two CMAs 270 in their second lives may be different based on their classification resulting from evaluation of their respective useful life indicators. Tracking and storage of useful life indicators can also be used to evaluate returned or warrantied battery packs 100, fix or refurbish battery packs 100 returned within their first life, and improve manufacturing processes by comparing various CMAs 270 to one another.

The useful life indicators are used to identify when a CMA 270 has reached an end of life threshold. The CMA 270 may have multiple end of life thresholds. For example, the CMA 270 may be suitable for use in a first application during the span of its first life (e.g., a commercial lawn mower). When the CMA 270 reaches its first end of life threshold (e.g., 80%, 75%, 70%, etc. of its useful life), the CMA 270 is taken out of service for the first application and returned to the CMA 270 manufacturer. The CMA 270 manufacture then categorizes or classifies the CMA 270 based on its useful life data to identify a suitable second life application for that particular CMA. If necessary, that CMA 270 is reconditioned or refurbished and then combined with other similarly classified CMAs 270 to form a battery pack 100 for use in a second life application. This new battery pack 100 can be used in the second life application until the CMA 270 reaches a second end of life threshold (e.g., 50%, 45%, 40%, etc. of its useful life). This method of using the same CMA 270 for different applications based on the CMA's life cycle allows the CMA 270 manufacturer to take greater advantage of the CMA's available capacity by using the CMA 270 in multiple applications. Instead of having a CMA 270 at the end of its first life discarded and not using the remaining battery capacity of the CMA 270, the CMA 270 may be used in multiple additional applications. The serviceability of the battery pack 100 with conventional service tools beneficially allows the CMAs 270 to be removed and replaced for second life applications.

The CMA 270 manufacturer may lease battery packs consisting of multiple CMAs 270 to the user of the equipment powered by the battery pack 100. This approach would enable the user of the CMA 270 during its first life to return the battery pack 100 at the end of its first life to the CMA 270 manufacturer, allowing the CMA 270 manufacturer to classify the CMAs 270 and reuse the CMA 270 and/or battery pack 100 for second life applications, where the resulting battery packs 100 could again be leased or sold to the user of the equipment powered by the battery pack 100 consisting of CMAs 270 in their second life. Alternatively, the CMA 270 manufacture can sell the battery pack 100 consisting of CMAs 270 and buy back the battery pack 100 at the end of the first life of the CMAs 270 for classification and reuse in a second life application.

The BMS 222 can be configured to identify which CMA 270 in the battery pack 100 is in need of servicing. For example, the BMS 222 may determine which CMA 270 experienced a failure in the battery pack 100. In some embodiments, to determine the faulty CMA 270, the BMS 222 measures readings of each voltage tap on each CMA 270. For example, the BMS 222 monitors each of the voltage taps 214 on each of the CMAs 270 and determines if the reading on each voltage tap 214 deviates from an expected measurement. The BMS 222 can be configured to trigger a service alarm for a faulty CMA. For example, when monitoring current draw patterns, if a CMA 270 is the first to hit a top voltage level or the first to hit a bottom voltage level (e.g., zero voltage), the BMS 222 identifies the "bad" CMA and triggers a service alarm. The BMS 222 may also monitor which CMA 270 in the battery pack 100 is first to charge or discharge in order to identify a malfunctioning CMA. Advantageously, the battery pack 100 is configured to be serviceable. As such, when a CMA is identified as faulty by the BMS 222, the individual CMA 270 can be swapped out for a functional CMA 270. In some embodiments, the BMS 222 also monitors and stores the temperature of each CMA 270 within the battery pack 100 using data received from a temperature sensor coupled to each CMA 270 (e.g., thermistors 217).

Figure 3:
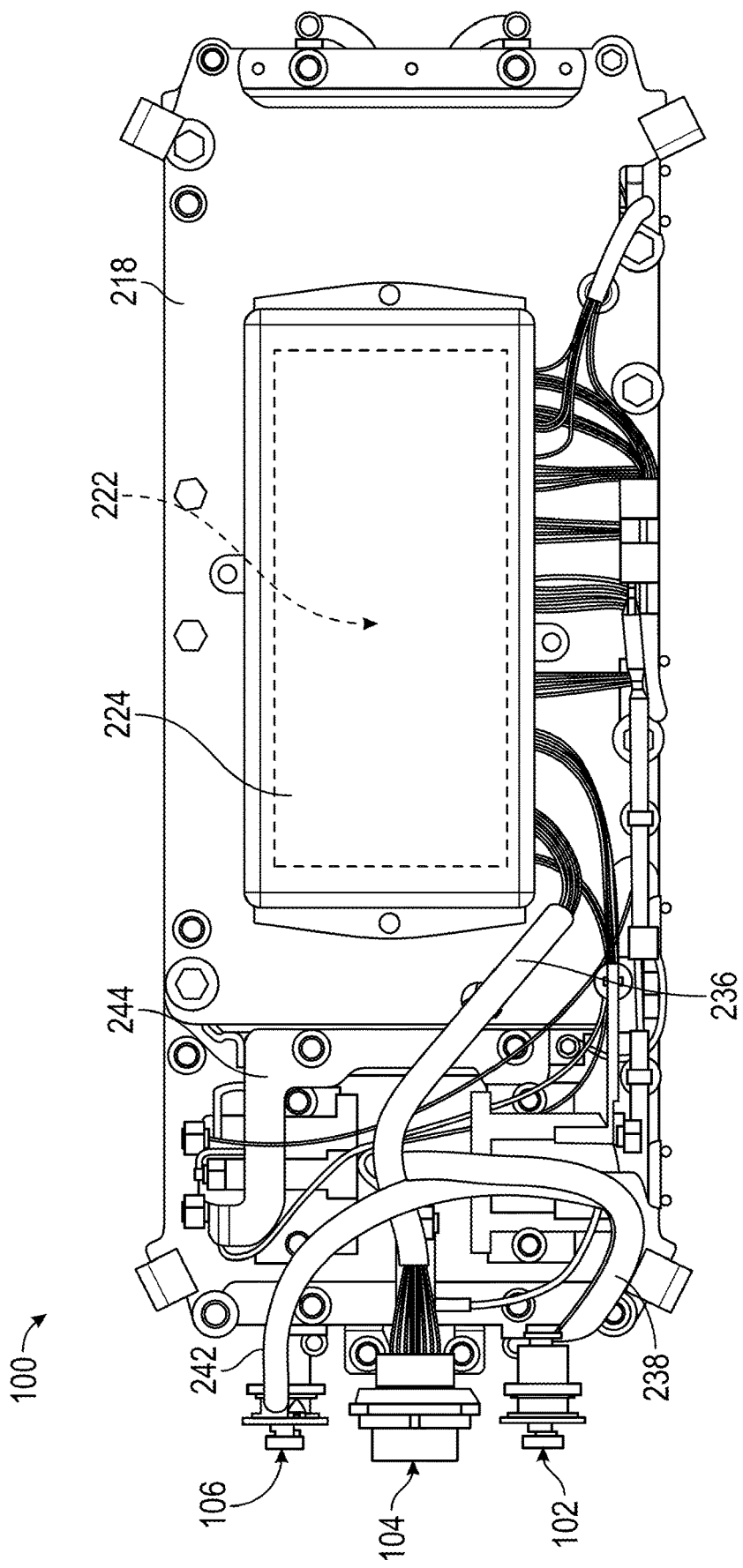
FIG. 3 is a top view of the battery pack of FIG. 2, according to an exemplary embodiment.

Referring to FIGS. 2-3, the BMS 222 includes several connectors on one side of the BMS 222. The input and output components of the BMS 222 may be fused to the BMS 222 with resettable fuses. In some embodiments, a BMS cover 224 is positioned surrounding the BMS 222. The BMS cover 224 can provide protection for the BMS 222 and the connectors and connections to various harnesses coupled to the BMS 222. In some embodiments, the BMS cover 224 is a structural potting box that is crush and impact resistant, as well as metal, thermal, and electronic magnetic interference (EMI) resistant. The BMS 222 includes thermistor connectors 226 for monitoring temperature of each of the CMAs 270 of the battery pack 100. The BMS 222 includes CMA voltage connectors 220 to receive data on the operation of the battery cells 202 and CMAs 270 throughout the battery pack 100. In some embodiments, a measurement read at positive voltage tap 232 is communicated to the BMS 222 via the CMA voltage connectors 220. Each connector of the BMS 222 may couple to a connection harness, similar to contactor harness 228 or shunt harness 230.

In some embodiments, the BMS 222 includes a precharge circuit and a bleed circuit integrated into the same board of the BMS 222. In some embodiments, the BMS 222 conducts a current profile of the battery pack 100 to detect what components are plugged into the battery pack 100. When an abnormal profile of the battery pack 100 is detected, the BMS 222 may signal an alarm as a notification of the abnormality. In some embodiments, when the battery pack 100 is connected in parallel or series with another battery pack, the BMS 222 writes to the neighboring BMS 222 of the connected battery pack 100 to update the old firmware with the newest firmware. The BMS 222 can also be configured to update a charger, or other energy source, for the battery pack 100 with newer firmware and can receive updates from the charger with newer firmware. In some embodiments, the BMS 222 can operate in three different states, recharge, charge, and hybrid. During the hybrid state, the BMS 222 may effectively charge the battery pack 100 when meant to be discharging, with or without communication. While charging, the BMS 222 may use adaptive charge limits. For example, if receiving regenerative charging, where the charge of battery pack 100 is being topped off, the BMS 222 may lower the top end charge limit to avoid a top end fault due to regenerative charging. The decision of the BMS 222 to lower the top end charge limit may be based on a frequency of fault occurrence. In another example, the BMS 222 may change the top end charge to 4.2 volts to prevent reaching a top end fault, when originally the top end charge was 4.1 volts per CMA 270.

The battery pack 100 can also include a CMA-to-CMA interlock 204. The CMA-to-CMA interlock 204 may allow the several CMAs 270 to be mounted in a parallel configuration. An end-of-string mount assembly 212 is also shown in the battery pack 100. The end-of-string mount assembly 212 may be used at both ends of a tier of the battery pack 100 to terminate a connection when a CMA 270 does not connect to another CMA 270. In some embodiments, the end-of-string mount assembly 212 is coupled to a negative collector plate 254. The negative collector plate 254 can extend outward from one side of the bottom CMA cell holder frame of a CMA 270. In some embodiments, the negative collector plate 254 extends away from an outermost set of pockets of the bottom CMA cell holder frame of the CMA 270 to form a generally planar bottom surface that is coupled to the end of string mount assembly 212.

Figure 4:
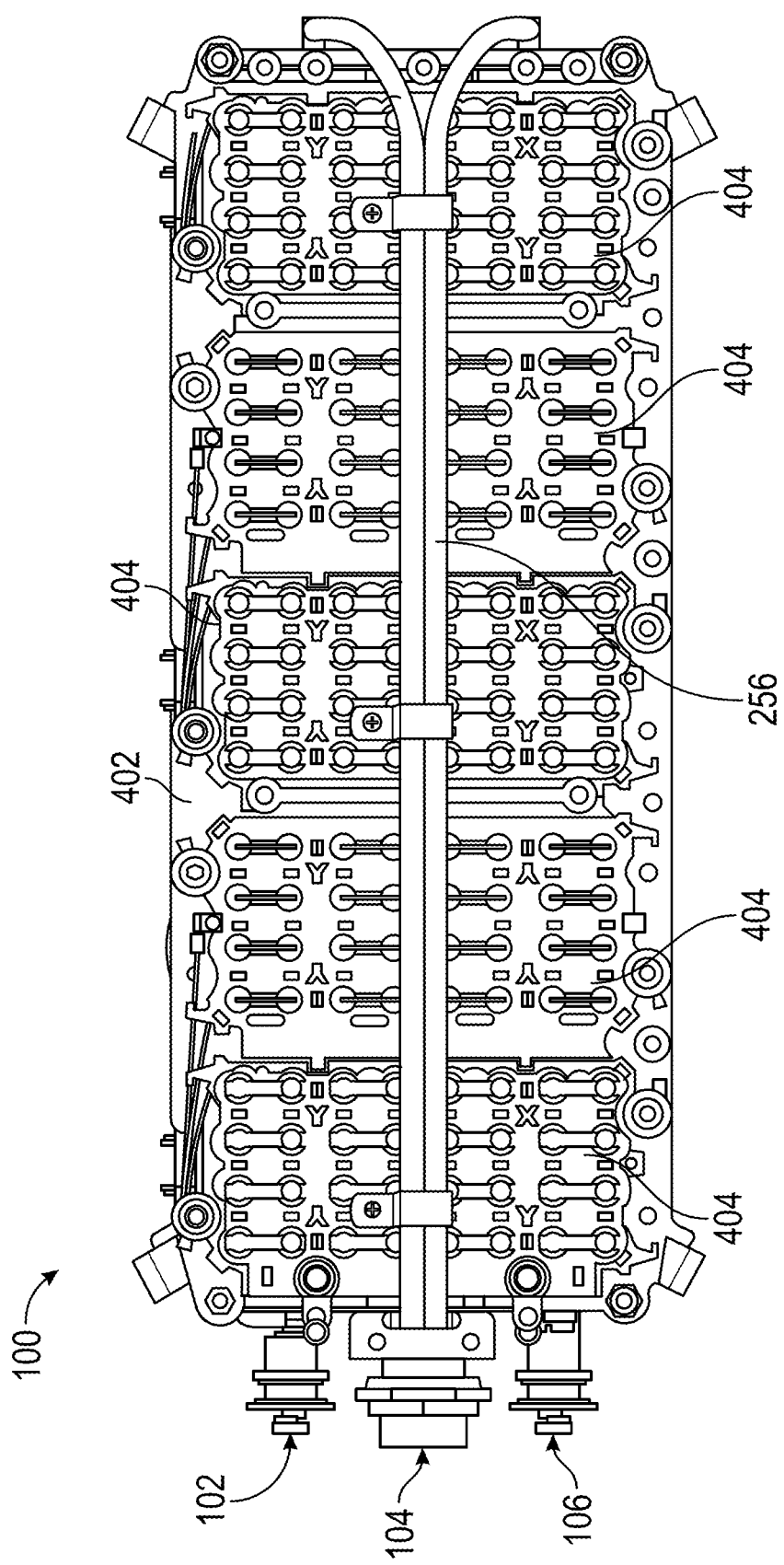
FIG. 4 is a bottom view of the battery pack of FIG. 2, according to an exemplary embodiment.
Figure 5:
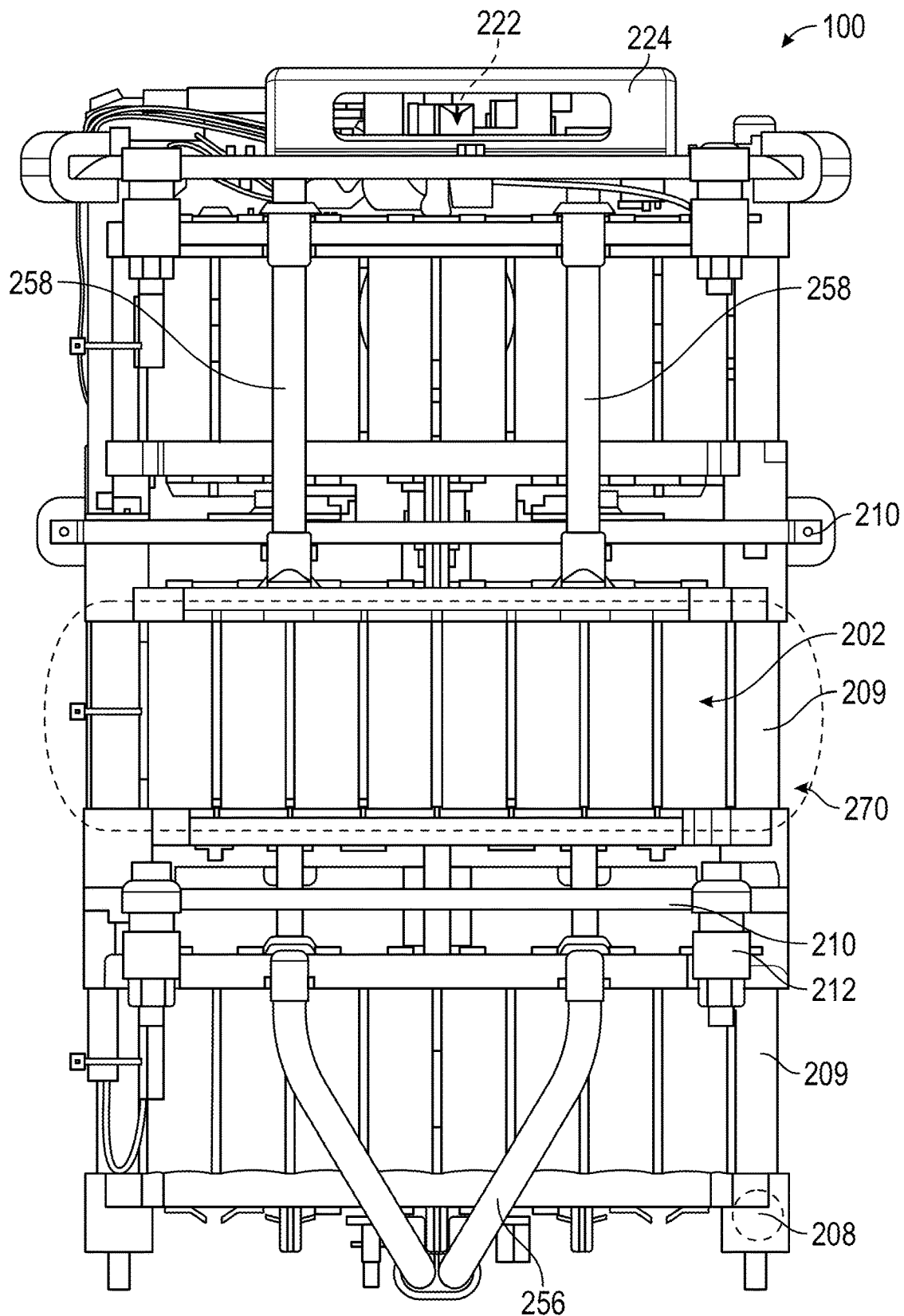
FIG. 5 is a rear view of the battery pack of FIG. 2, according to an exemplary embodiment.
Figure 6:
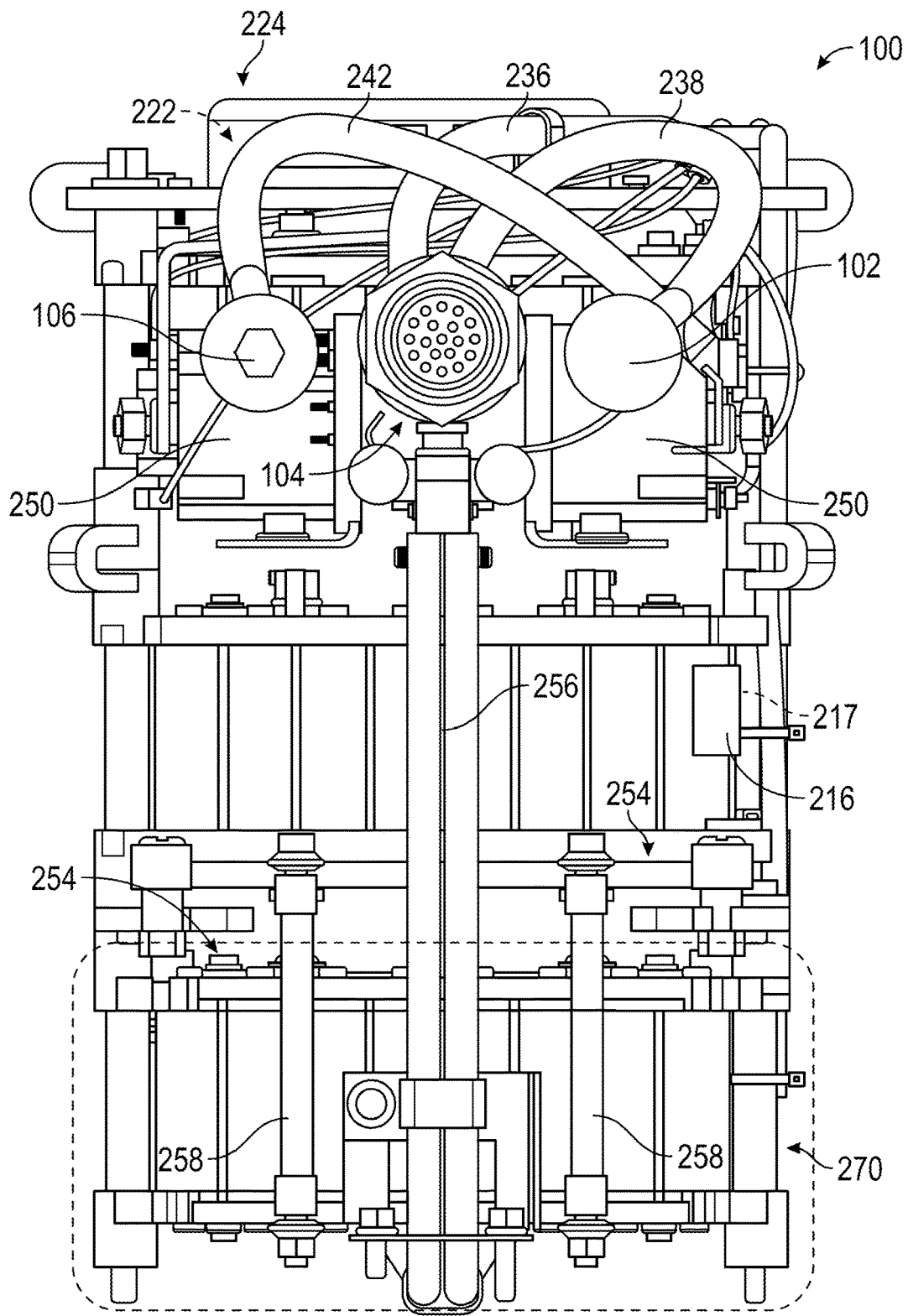
FIG. 6 is a front view of the battery pack of FIG. 2, according to an exemplary embodiment.

The battery pack 100 can also include a communication harness 236, a negative cable assembly 238, a contactor-to-contactor busbar 240, a positive cable assembly 242, a positive terminal-to-contactor busbar 244, a positive terminal 106, a panel-mount data connector 104, a negative terminal 102, battery pack dual contactors 250, contactor coil terminals 252, negative CMA-to-ground cable assembly 256, series tier flexible busbars 258, shunt isolators 262, and a CMA cell holder 264. In some embodiments, the communication harness 236 connects the panel-mount data connection terminal 104 to the BMS 222. In some embodiments, the data connection terminal 104 is coupled to the front panel of the housing 108 for the battery pack 100. The negative CMA-to-ground assembly 256 may run underneath the battery pack 100 and up to an end-of-string mount assembly 212, using negative cable routing, from the first CMA 270 block to the ground 272 of the last CMA 270 block. In some embodiments, the negative CMA-to-ground assembly is routed from a first CMA 270 on the top tier of the battery pack 100, down the front side (e.g., as shown in FIG. 6) of the battery pack 100, below a base plate (e.g., as shown in FIG. 4) of the battery pack 100, and up a rear side (e.g., as shown in FIG. 5) of the battery pack 100 to connect to a last CMA 270 on the bottom tier of the battery pack 100. The series tier flexible busbars 258 electrically connect the various tiers of the battery pack 100. In some embodiments, the CMA cell holder 264 is a bottom CMA cell holder frame (e.g., bottom CMA cell holder frame 704, shown in FIG. 7) coupled to the negative terminals of the battery cells 202 for each CMA 270.

A top view of the battery pack 100 is shown in FIG. 3, according to an exemplary embodiment. The contactor-to-contactor busbar 244 extends to a position near the top of the battery pack 100, and can be coupled with a plurality of CMAs 270 simultaneously. The positive cable assembly 242 extends to the positive terminal 106. The negative cable assembly 238 extends upward to the negative terminal 102. The communication harness 236 extends upward from the BMS 222 to the data connection terminal 104. The BMS cover 224 and the top plate 218 form a top portion of the battery pack 100.

Referring now to FIG. 4, of the bottom of the battery pack 100 is shown, according to an exemplary embodiment. The bottom of the battery includes a base plate 402 and bottom collector plates 404. Each bottom collector plate 404 is coupled to the bottom of each CMA 270 block of the battery pack 100. As depicted in FIG. 4, the negative CMA-to-ground cable assembly 256 runs beneath the battery pack 100. In some embodiments, some of the bottom collector plates 404 may be negative collector plates coupled to the negative terminals of the battery cells 202 in a CMA 270. Other bottom collector plates 404 are positive collector plates coupled to the positive terminals of the battery cells 202 in a CMA 270 of the bottom tier of the battery pack 100.

The battery cells 202 in each CMA 270 of the battery pack 100 can be placed in electrical communication with one another using a bottom collector plate (e.g., bottom collector plate 404) and a top collector plate. The collector plates can be formed of an electrically conducting metallic material (e.g., copper, aluminum) that can receive and conduct current through terminals extending away from each battery cell 202. The thickness of the top and bottom collector plates can be selected to carry an amount of current without significant raise in the temperature of the collector plates. The thickness of the collector plates may also give current pass-through points sufficient area at lap joints between plates. The collector plates can also be arranged to reduce torque requirements for clamping plates by spreading out clamp forces. The bolting patterns of the collector plates can allow symmetrical, even flow of current across each CMA. In some embodiments, each of the battery cells 202 includes a positive terminal connected to the top collector plate and a negative terminal connected to the bottom collector plate. Conversely, each of the positive terminals could be connected to the bottom collector plate, while each of the negative terminals could be connected to the top collector plate.

Each of the collector plates can include a series of apertures formed through a generally rectangular base. The number of apertures formed through each collector plate can correspond to the number of battery cells 202 that are present in or that could be present in the CMA 270. The bottom collector plate can be coupled to a bottom CMA cell holder frame 704 (FIG. 7) so that each aperture is positioned below a pocket of the bottom CMA cell holder frame 704. Each aperture can be aligned with (i.e., overlapping to some extent) a terminal hole in the bottom CMA cell holder frame 704. The overlapping orientation can allow a terminal of a battery cell 202 received within the pocket to extend downward through the bottom CMA cell holder frame 704 and the bottom collector plate to make an electrical connection with a bottom surface of the bottom collector plate. Similarly, the top collector plate can be coupled to the top CMA cell holder frame 702 (FIG. 7) so that each aperture is positioned above a pocket of the top CMA cell holder frame 702. Each aperture can also be aligned with a terminal hole in the top CMA cell holder frame 702 so that a terminal of a battery cell 202 received within a pocket can extend through the top CMA cell holder frame 702 and the base of the top collector plate.

The top and bottom collector plates (e.g., the bottom collector plates 404) each have generally complimentary geometry to seat upon the bottom CMA cell holder frame 704 and the top CMA cell holder frame 702. For example, the apertures of top collector plates and bottom collector plates 404 can be defined by a generally elongate oval shape that can be received around locating features of the top CMA cell holder frame 702 and the bottom CMA cell holder frame 704. The shape of the apertures can form a clearance fit around the locating features to help position the top collector plates and bottom collector plates 404 during assembly of the CMA.

Referring now to FIG. 5, a rear view of the battery pack 100 is shown, according to an exemplary embodiment. As depicted in FIG. 5, the BMS 222 is positioned inside of the BMS cover 224 and on top of three different tiers of CMAs 270 in the battery pack 100. The rear view depicts the connections between the different tiers of the battery pack 100. The series tier flexible busbars 258 are shown connecting the top tier to the middle tier. In between the tiers, the spacers 209 are shown. The spacers 209 may couple the top CMA cell holder frames 702 (FIG. 7) to the bottom CMA cell holder frames 704 (FIG. 7) of each CMA 270 in each tier of the battery pack 100. The midplates 210 are positioned between the tiers of the battery pack 100 and the negative CMA-to-ground cable assembly 256 coupled to one of the end-of-string mount assemblies 212 at ground 272. In some embodiments, the top tier includes four CMAs 270, the middle tier of the battery pack 100 includes five CMAs 270, and the bottom tier includes five CMAs 270. In other embodiments, the battery pack 100 may have more or less than fourteen total CMAs 270.

Each CMA 270 in the battery pack 100 can be the same (e.g., the same number of cells, same output rating, etc.) as the others in the battery pack 100 and includes an end connection with an interface to provide up or down routing or terminate, since the "end" CMA 270 does not connect to another CMA 270. The end connection component of each CMA 270 is common to connect to other CMAs 270 of the battery pack 100. In some embodiments, one or more of the CMAs 270 in the battery pack 100 may have the same form factor as a CMA 270 without "power control," but may also include a contactor, a current sensor (e.g., a shunt resistor), and a BMS controller to manage the power of the CMA 270 "power control" block.

In some embodiments, all thirty-two battery cells 202 are connected in parallel in a 1S32P (one series, thirty-two parallel) arrangement by a single top collector plate (e.g., positive collector plate 266) and a single bottom collector plate (e.g., negative collector plate 254), with all the battery cells 202 pointed in a single direction. In other embodiments, two groups of sixteen battery cells 202 are connected in parallel with the two groups connected in series in a 2S16P (two series, sixteen parallel) arrangement. In some embodiments, the battery cells 202 may be connected in parallel from a 1S16P (one series, sixteen parallel) arrangement, while in other embodiments the battery cells 202 may be connected in a 2S32P (two series, thirty-two parallel) arrangement with a contactor plate change. Top collector plates and bottom collector plates can be used to connect the thirty-two battery cells 202. In some embodiments, each top collector plate 266 and each bottom collector plate 254 can support and connect sixteen battery cells 202 in parallel. The two sets of sixteen battery cells 202 can then be electrically coupled together to place the sets of sixteen battery cells 202 in series with one another. Arranging a relatively large number of battery cells 202 in parallel in this manner helps to slow the degradation of the charge capacity of the CMA 270. In other embodiments, the number of battery cells 202 in the CMA 270 may be greater or fewer and the connection arrangements between the battery cells 202 may vary depending on the ratings needed from a particular CMA 270 (e.g., voltage, capacity, power, etc.). Each battery cell 202 has a positive terminal and a negative terminal.

Referring now to FIG. 6, a front view of the battery pack 100 is shown, according to an exemplary embodiment. As depicted in FIG. 6, the contactors 250, the positive terminal 106, the panel-mount data connection terminal 104, the negative terminal 102, the positive cable assembly 242, the negative cable assembly 238 and the communication harness 236 are each positioned near the front of the battery pack 100. In some embodiments, the dual contactors 250, the positive terminal 106, the negative terminal 102, and the panel-mount data connection terminal 104 are positioned in line with the top tier of the battery pack 100. The thermistor tape 216 and thermistor 217 are each coupled to a battery cell 202 of a CMA 270 in the battery pack 100. In some embodiments, each CMA 270 of the battery pack 100 includes one thermistor 217 in order to monitor the current temperature levels of each CMA 270 throughout the battery pack 100. As such, the variability in temperature throughout the battery pack 100 may be tracked and managed by the BMS 222. The different tiers of the battery pack 100 can also be seen from a front of the battery pack 100. In some embodiments, the battery pack 100 may have more or less than three tiers of CMAs.

Figure 7:
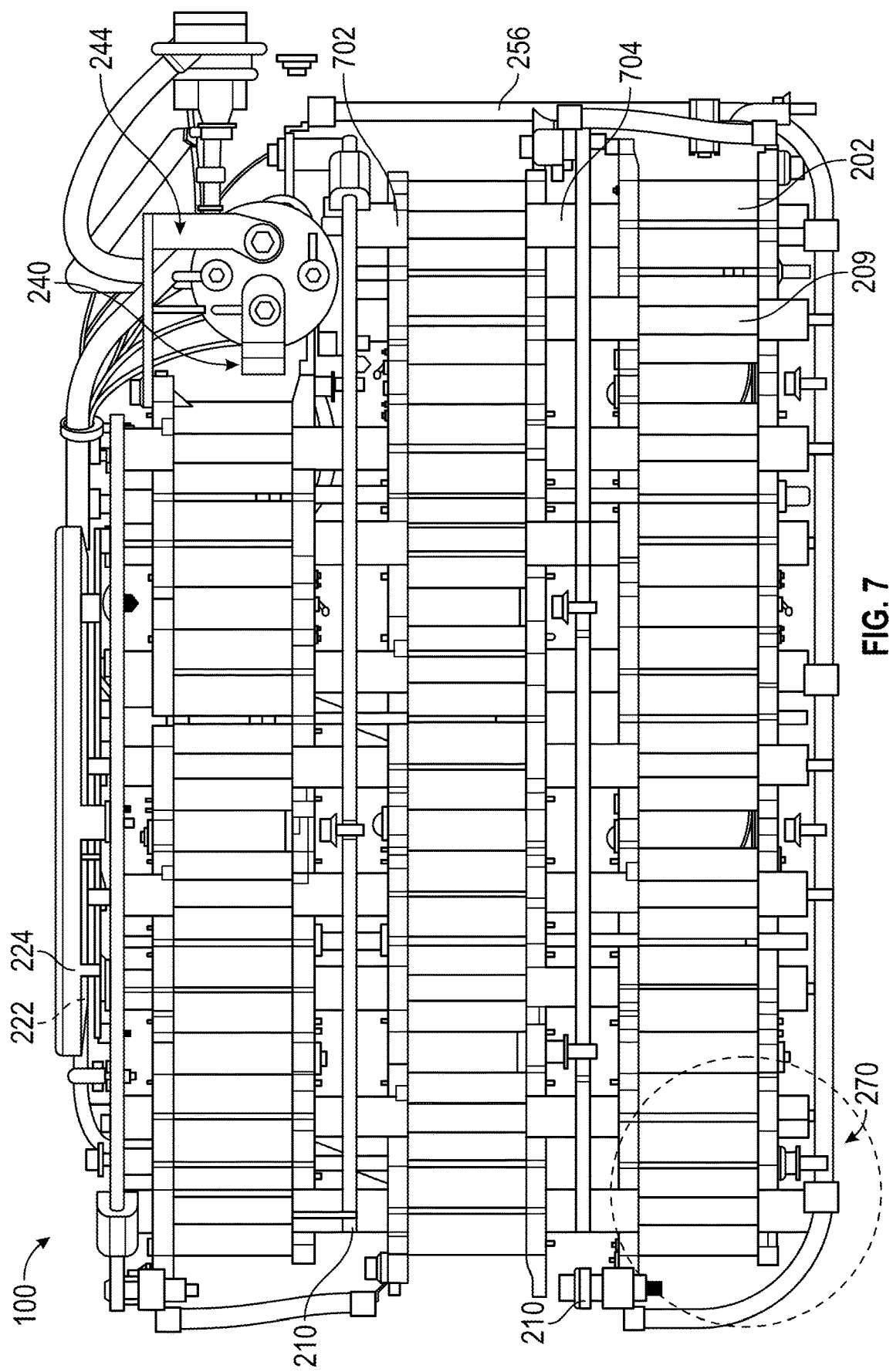
FIG. 7 is a left side view of the battery pack of FIG. 2, according to an exemplary embodiment.

Referring now to FIG. 7, The battery pack 100 is shown in additional detail. The battery cells 202 are supported by a top CMA cell holder frame 704 and a bottom CMA cell holder frame 706. The top CMA cell holder frame 702 and the bottom CMA cell holder frame 704 can each be continuous (e.g., singular or monolithic) components formed of insulating polymeric materials. The bottom CMA cell holder frame 704 may include a generally rectangular base including a series of cylindrical protrusions extending upwardly away from the base. The cylindrical protrusions define a series of pockets that can each receive a battery cell 202, for example. Each pocket can include a generally circular base circumscribed by the cylindrical protrusion associated with the pocket. In some embodiments, a terminal hole is formed through the base of the bottom CMA cell holder frame 704. The terminal hole can be approximately centered within the base to allow a terminal of a battery cell 202 to extend through the bottom CMA cell holder frame 704. Alternatively, the terminals may be entirely contained within the pocket, and the terminal holes allow access to the terminals of the battery cells 202. Access to the terminals of the battery cells 202, generally, can be helpful in assembly and/or maintenance processes where wire bonds between the terminals and battery cells 202 are being created or repaired. Windows can be formed in the base and/or the cylindrical protrusions to define adhesive flow paths through the bottom CMA cell holder frame 704 onto the battery cells 202 positioned within the pockets of the bottom CMA cell holder frame 704. A curable adhesive may be used to ensure robust coupling between the battery cells 202 and the bottom CMA cell holder frame 704. Additionally, the curable adhesive may be used to couple the bottom collector plates (e.g., negative collector plate 254) to the bottom CMA cell holder frames 704.

The top CMA cell holder frame 702 can include many of the same features present in the bottom CMA cell holder frame 704. Because the top CMA cell holder frame 702 may be a substantial mirror image of the bottom CMA cell holder frame 704 in some embodiments, components present in the top CMA cell holder frame 702 having common names in both the bottom CMA cell holder frame 704 and the top CMA cell holder frame 702 should be considered to have the same or substantially similar geometries, orientations, structures, or relationships to other components as described with reference to the bottom CMA cell holder frame 704. The top CMA cell holder frame 702 also includes a generally rectangular base. A series of cylindrical protrusions may extend upwardly away from the base to define another series of pockets that can each receive a battery cell 202. Each pocket can include a generally circular base circumscribed by the cylindrical protrusion associated with the pocket. A terminal hole can be formed through the base. Windows can be formed in the base and/or the cylindrical protrusions to define adhesive flow paths through the top CMA cell holder frame 704 onto the battery cells 202 positioned within the pockets. The top surface of the top CMA cell holder frame 702 may include recesses formed into the top CMA cell holder frame 702 to define adhesive flow paths. The recesses can direct curable adhesive around battery cells 202 during the CMA 270 assembly process, which can help create a robust coupling between battery cells 202 and the top CMA cell holder frame 702. Furthermore, the curable adhesive may be used to couple the top collector plates (e.g., positive collector plate 266) to the top CMA cell holder frames 702.

In some embodiments, the CMAs 270 may be scaled so that the CMAs 270 adjust to changes in lengths and diameters of the battery cells 202 used for the CMAs 270. The top CMA cell holder frame 702 and the bottom CMA cell holder frame 704 may be varying lengths depending on the number of cells used in the CMAs 270 and the type of battery cells 202 used for each CMA 270. For example, the pockets of the top CMA cell holder frame 702 and the bottom CMA cell holder frame 704 may vary in cylindrical cell form factors depending on the diameters of the battery cells 202 utilized in the battery pack 100. The battery pack 100 may also be assembled to use longer or shorter battery cells 202, in which case the top CMA cell holder frame 702 and the bottom CMA cell holder frame 704 may be closer together in height or father apart in height. In some embodiments, when battery cells 202 have a different diameter, the same mounting points (e.g., bolt patterns) for each CMA 270 is used for the construction of the CMAs 270, but the top CMA cell holder frame 702 and the bottom CMA cell holder frame 704 have altered pocket sizes to accept the different battery cells 202.

The spacers 209 can be defined by a height (i.e., a longitudinal length) that is larger than a height of each battery cell 202. By being taller than the battery cells 202, compressive loading experienced by either of the top CMA cell holder frame 702 or the bottom CMA cell holder frame 704 is initially diverted to the spacers 209, which engage the collars of the frames. The spacers 209 keep the bottom CMA cell holder frame 704 and the top CMA cell holder frame 702 at a fixed distance apart from one another, which prevents the top CMA cell holder frame 702 and the bottom CMA cell holder frame 704 from applying extreme or otherwise unwanted compressive stress to each battery cell 202 that could be caused by loading from another CMA 270 positioned in a tier of the battery pack 100 above the CMA 270, for example.

Figure 8:
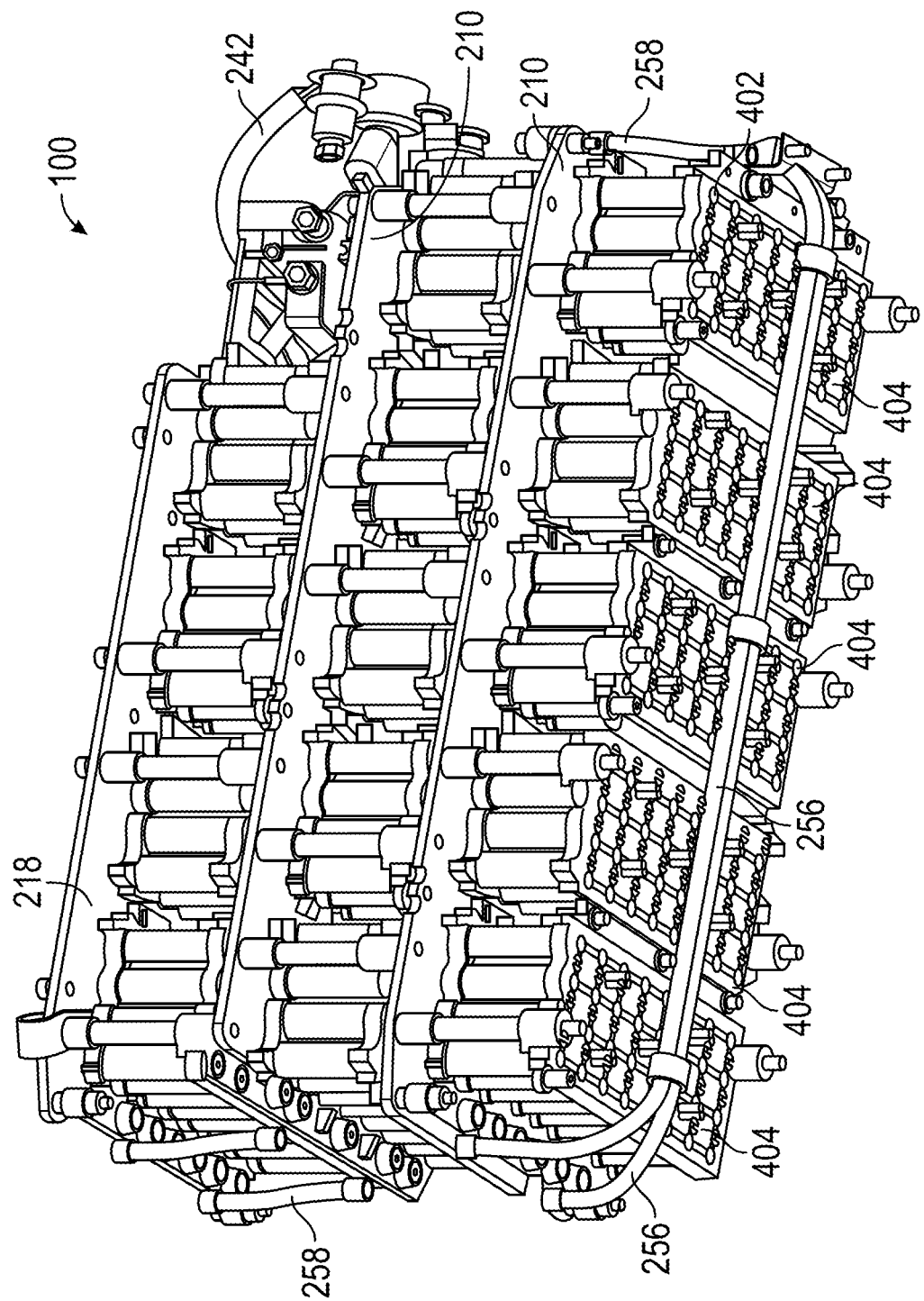
FIG. 8 is a bottom perspective view of the battery pack of FIG. 2, according to an exemplary embodiment.

Referring now to FIG. 8, the three tiers of the battery pack 100 and the base plate 402 coupled to the bottom of the battery pack 100 are depicted. The bottom collector plates 404 are also shown coupled to the bottom of the CMAs 270 in the bottom tier of the battery pack 100. The positive cable assembly 242, the top plate 218, the midplates 210, the negative CMA-to-ground cable assembly 256, and the series flexible busbars 258 (which extend between tiers), among other components of the battery pack 100 are visible from this view.

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

The construction and arrangements of the present disclosure, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A battery pack, comprising:
a battery housing defining an internal cavity;
a positive terminal and a negative terminal, the positive terminal and the negative terminal each extending through the housing;
a plurality of cell module assemblies (CMAs) received within the internal cavity, the plurality of CMAs being electrically coupled to the positive terminal and the negative terminal, wherein each of the plurality of cell module assemblies comprises:
a top CMA cell holder frame defining a plurality of first pockets;
a bottom CMA cell holder frame defining a plurality of second pockets;
a top collector plate coupled to the top CMA cell holder frame;

a bottom collector plate coupled to the bottom CMA cell holder frame; and a plurality of lithium-ion battery cells, the plurality of the lithium-ion battery cells being connected in parallel, each of the plurality of lithium-ion battery cells being partially received in one of the plurality of first pockets and partially received in one of the plurality of second pockets, the plurality of lithium-ion battery cells each being coupled to the top collector plate and the bottom collector plate;

an aluminum midplate arranged between at least two of the plurality of CMAs, wherein the at least two of the plurality of CMAs are separated from one another with the aluminum midplate being arranged therebetween so that an air gap is formed between the at least two of the plurality of CMAs and the aluminum midplate; and a battery management system, the battery management system being in communication with at least one of the plurality of CMAs within the internal cavity, the battery management system structured to:

receive a voltage tap measurement from each of the plurality of CMAs within the internal cavity;

compare the voltage tap measurement from each of the plurality of CMAs to an expected voltage tap measurement;

determine if a voltage tap measurement for a CMA within the plurality of CMAs deviates from the expected voltage tap measurement and in response to determining that the voltage tap measurement for a CMA within the plurality of CMAs deviates from the expected voltage tap measurement, generate an alarm including locating information identifying which of the plurality of CMAs has a voltage tap measurement that deviates from the expected voltage tap measurement.

2. The battery pack of claim 1, wherein each of the plurality of CMAs are removably coupled to each of the positive terminal and the negative terminal.

3. The battery pack of claim 1, wherein each of the plurality of CMAs include a thermistor mounted to at least one of the lithium-ion battery cells using closed cell foam adhesive, wherein the thermistor is configured to communicate a temperature measurement of the at least one lithium-ion battery cell with the battery management system.

4. The battery pack of claim 1, wherein each of the CMAs within the internal cavity are connected in parallel and at least two of the CMAs within the internal cavity are connected in series.

5. The battery pack of claim 1, wherein the battery management system is received within an electromagnetic interference resistant metallic housing.

6. The battery pack of claim 1, wherein the battery pack is configured to output a nominal voltage through the positive terminal and the negative terminal between about 24 V and about 48 V.

7. The battery pack of claim 1, wherein the battery management system is coupled to a dual controller area network (CAN) bus, the dual CAN bus being configured to communicate information from the battery management system over at least two baud rates.

8. The battery pack of claim 7, wherein the battery management system includes a memory configured to store firmware updates that can be received and transmitted using the dual CAN bus.

9. The battery pack of claim 1, wherein the battery management system conducts a current profile of the battery pack to detect a type of equipment that is coupled with the positive terminal and the negative terminal of the battery pack.

10. The battery pack of claim 1, wherein a data connection terminal extends through the battery housing and defines a series of data terminals in communication with the battery management system.

11. The battery pack of claim 1, wherein the battery management system controls a charging threshold of each CMA within the battery pack, wherein the battery management system adjusts an upper limit of the charging threshold based upon a recharging type.

12. The battery pack of claim 1, wherein a circulating fan is received within the housing.

13. The battery pack of claim 1, wherein the battery housing is a 5-sided structure removably coupled to a baseplate, the baseplate supporting the plurality of CMAs.

14. The battery pack of claim 1, further comprising a CMA-to-ground cable extending at least partially beneath the plurality of CMAs within the battery pack and configured to connect each of the plurality of CMAs to a common ground.

15. A battery pack, comprising:

a battery housing defining an internal cavity;

a positive terminal and a negative terminal, the positive terminal and the negative terminal each extending through the housing;

a plurality of cell module assemblies (CMAs) received within the internal cavity, the plurality of CMAs being electrically coupled to the positive terminal and the negative terminal, wherein each of the plurality of cell module assemblies comprises:

a top CMA cell holder frame defining a plurality of first pockets;

a bottom CMA cell holder frame defining a plurality of second pockets;

a top collector plate coupled to the top CMA cell holder frame;

a bottom collector plate coupled to the bottom CMA cell holder frame; and a plurality of lithium-ion battery cells, the plurality of the lithium-ion battery cells being connected in parallel, each of the plurality of lithium-ion battery cells being partially received in one of the plurality of first pockets and partially received in one of the plurality of second pockets, the plurality of lithium-ion battery cells each being coupled to the top collector plate and the bottom collector plate; and a battery management system, the battery management system being in communication with at least one of the plurality of CMAs within the internal cavity, the battery management system structured to:

receive a voltage tap measurement from each of the plurality of CMAs within the internal cavity;

compare the voltage tap measurement from each of the plurality of CMAs to an expected voltage tap measurement;

determine if a voltage tap measurement for a CMA within the plurality of CMAs deviates from the expected voltage tap measurement and in response to determining that the voltage tap measurement for a CMA within the plurality of CMAs deviates from the expected voltage tap measurement, generate an alarm including locating information identifying which of the plurality of CMAs has a voltage tap measurement that deviates from the expected voltage tap measurement, wherein the battery pack is defined by at least two tiers of CMAs, wherein a first tier of CMAs is spaced from a second tier of CMAs with a midplate extending therebetween so that an air gap is arranged between each of the first tier of CMAs and the second tier of CMAs and the midplate, and wherein the first tier of CMAs and the second tier of CMAs are electrically coupled together by a busbar extending between at least one of the CMAs within the first tier of CMAs and at least one of the CMAs within the second tier of CMAs.

16. The battery pack of claim 15, wherein the battery pack is defined by at least three tiers of CMAs, wherein a third tier of CMAs includes less CMAs than the second tier of CMAs.

17. The battery pack of claim 15, wherein the first tier of CMAs can be electrically isolated from the second tier of CMAs by disconnecting the busbar.

* * * * *